(12) United States Patent
Peng et al.

(10) Patent No.: US 8,688,763 B2
(45) Date of Patent: Apr. 1, 2014

(54) SYSTEMS AND METHODS FOR PROVIDING PROGRAMMABLE ANALOG CLASSIFIERS

(75) Inventors: Sheng-Yu Peng, Atlanta, GA (US); Paul E. Halser, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 1215 days.

(21) Appl. No.: 12/242,306

(22) Filed: Sep. 30, 2008

(65) Prior Publication Data

US 2010/0079188 A1 Apr. 1, 2010

(51) Int. Cl.
*G06G 7/00* (2006.01)

(52) U.S. Cl.
USPC ............................................ 708/801; 706/20

(58) Field of Classification Search
USPC ............................................ 708/801; 706/20
See application file for complete search history.

(56) References Cited

U.S. PATENT DOCUMENTS

2005/0156775 A1* 7/2005 Petre et al. ............... 341/155

OTHER PUBLICATIONS

Peng et al., "A programmable analog radial-basis-function based classifier", May 2008, IEEE, pp. 1425-1428.*
Peng et al., "An Analog Programmable Multidimensional Radial Basis Function Based Classifier", 2007, IEEE, pp. 7-18.*
Peng et al., "A Programmable Floating-Gate Bump Circuit with Variable Width", 2005, IEEE, pp. 4341-4344.*
Kirk, "Accurate and Precise Computation using Analog VLSI with Application to Computer Graphics and Neural Networks", pp. 127-132. 1993.*

* cited by examiner

*Primary Examiner* — Chuong D Ngo
(74) *Attorney, Agent, or Firm* — Troutman Sanders LLP; Ryan A. Schneider, Esq.

(57) ABSTRACT

The present invention describes systems and methods to provide programmable analog classifiers. An exemplary embodiment of the present invention provides an analog classifier circuit comprising a bump circuit enabled to store a template vector, wherein the template vector can model a probability distribution with exponential behavior. Furthermore, the bump circuit is enabled to generate an output corresponding to a comparison between an input vector received by the bump circuit and the template vector stored by the bump circuit. Additionally, the analog classifier circuit includes a variable gain amplifier in communication with the bump circuit, and the variable gain amplifier can be adjusted to modify the variance of the template vector.

20 Claims, 17 Drawing Sheets

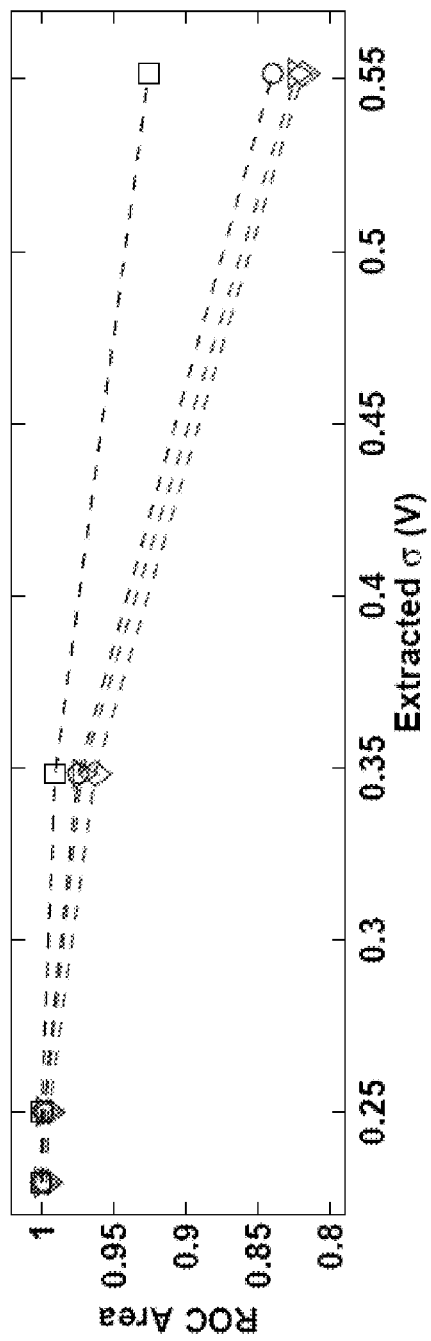
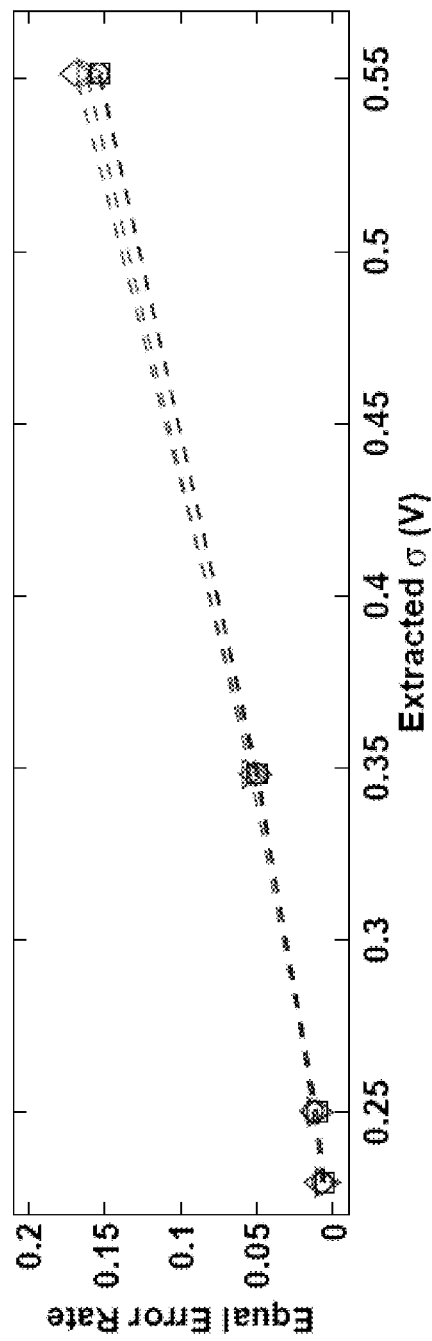
FIG. 17A
FIG. 17B

SYSTEMS AND METHODS FOR PROVIDING PROGRAMMABLE ANALOG CLASSIFIERS

FIELD OF THE INVENTION

The present invention relates generally to systems and methods for providing analog classifiers and, more particularly, to systems and methods for providing programmable analog classifiers.

BACKGROUND OF THE INVENTION

Moore's Law posits that the number of transistors that can be inexpensively placed on an integrated circuit increases exponentially over time, doubling approximately every two years. Moore's Law was based upon an observation made by Intel co-founder Gordon E. Moore in a 1965 publication. This theory has held true for almost half a century of transistor technology development. This aggressive scaling of silicon technologies has led to transistors and many sensors becoming faster and smaller. The trend toward integrating sensors, interface circuits, and microprocessors into a single package or into a single chip is more and more prevalent. Although fabrication and packaging technologies enable an unprecedented number of components to be packed into a small volume, the accompanying power density can be higher than ever. This has become one of the bottle-neck factors in microsystem development. Conventionally, all classification, decision-making, or, in a more general term, information refinement tasks are performed in an digital processor.

For example, the typical conventional microsystem, receives analog inputs via sensors and passes the sensed signals to an analog to digital converter. Once the analog waveforms have been converted to digital signals, digital processing technology is then used to analyze the data, such as performing classification and data refinement. The analog-to-digital conversion of a broad range of analog inputs and the processing of a broad spectrum of data results in a large amount of power consumption by the analog-to-digital converter and the digital processor. In many conventional Microsystems, the digital processor may spend valuable processing time computing largely irrelevant analog input data.

If the information-refinement tasks could be performed in the analog domain with less power consumption, the specifications for the analog-to-digital-converters, which are usually power-hungry, can be relaxed. In some cases, depending upon the accuracy of the information-refinement, analog-to-digital conversion could be avoided altogether. Such systems could therefore significantly improve power efficiency over conventional systems.

Radial basis functions ("RBF"s) are widely used as the similarity measures in many recognition and classification applications. To efficiently realize the Gaussian or Gaussian-like radial basis functions in analog neural networks or classifiers, many analog RBF circuits have been utilized in the prior art. Among these previous works, the "bump" circuit in is the most classic because of its simplicity. The bump circuit is a small analog circuit for computing the similarity of two voltage inputs. The output current from the circuit becomes large when the two input voltages are close to each other and decreases exponentially when the input voltage difference increases. Thus, the output current from a bump circuit reaches a maximum value when the two input voltages are equal and the output current exponentially decreases when the voltage difference decreases. The transfer curve created by an analysis of the output current of a bump circuit is shaped like a Gaussian function; therefore, this simple circuit can be used to approximate a Gaussian function.

Although conventional RBF classifiers that implement a bump circuit to approximate the Gaussian function may work in certain limited applications, that are significantly inadequate in fully approximating the Gaussian function because these conventional classifiers cannot adjust the width of the transfer curve. Another drawback of these conventional devices is that they require extra hardware to store or to periodically refresh template data when they are employed in a recognition system. In view of these drawbacks, conventional analog classifiers are inaccurate and fail to provide statistic information that significantly reduces the amount of digital processing required. Most importantly, without the ability to approximate the variance of the Gaussian function, these conventional analog classifiers are insufficient.

Therefore, it would be advantageous to provide an apparatus and method for efficiently and accurately classifying analog signals.

Additionally, it would be advantageous to provide an apparatus and method to provide an analog classifier enabled to approximate the variance of the Gaussian function.

Additionally, it would be advantageous to provide an improved system and method for low power classification of analog data on the front end of a sensory device before digital processing is conducted.

BRIEF SUMMARY OF THE INVENTION

The present invention describes systems and methods to provide programmable analog classifiers. An exemplary embodiment of the present invention provides an analog classifier circuit comprising a bump circuit enabled to store a template vector, wherein the template vector can model a probability distribution with exponential behavior. Furthermore, the bump circuit is enabled to generate an output corresponding to a comparison between an input vector received by the bump circuit and the template vector stored by the bump circuit. Additionally, the analog classifier circuit includes a variable gain amplifier in communication with the bump circuit, and the variable gain amplifier can be adjusted to modify the variance of the template vector.

These and other objects, features and advantages of the present invention will become more apparent upon reading the following specification in conjunction with the accompanying drawing figures.

BRIEF DESCRIPTION OF THE FIGURES

FIGS. 17A-B provide graphs of effects of the widths of the analog classifier circuits 100 in accordance with an exemplary embodiment of the present invention.

DETAILED DESCRIPTION OF PREFERRED EMBODIMENTS

Figure 1:
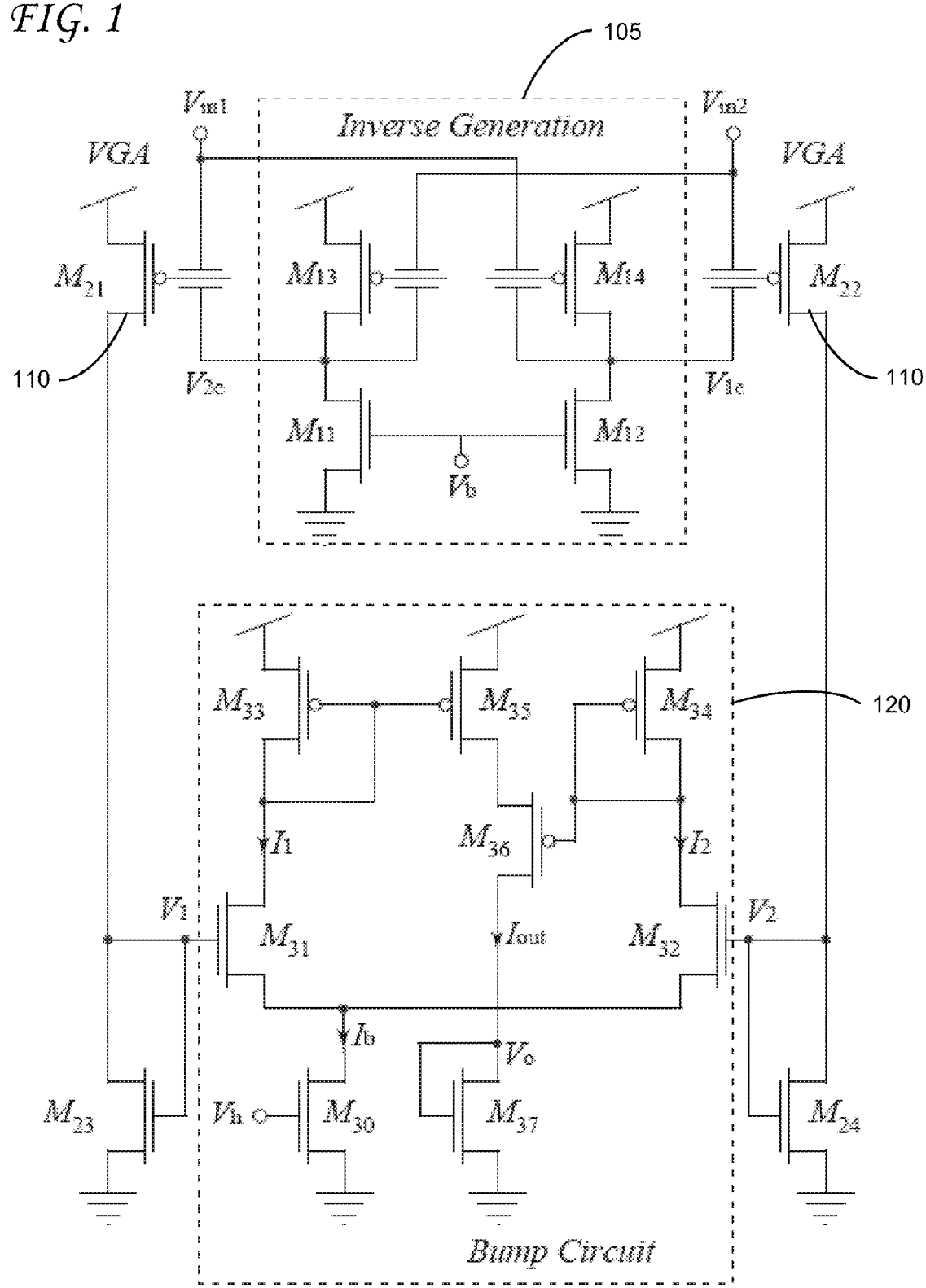
FIG. 1 provides a schematic of an analog classifier circuit 100 in accordance with an exemplary embodiment of the present invention.

The present invention addresses the deficiencies in the prior art concerning the inability of analog classifiers to efficiently and accurately classify information. Significantly, the present invention provides methods and apparatus for providing efficient and effective analog classifiers. An analog classifier system provided in accordance with the present invention is enabled to efficiently classify incoming analog information with a significant level of precision. Additionally, the present invention overcomes the drawbacks of the conventional methods and systems in the prior art and provides systems and methods enabled to program analog classifiers.

In an exemplary embodiment, the present invention provides an analog classifier circuit comprising a bump circuit enabled to store a template vector, wherein the template vector can model a probability distribution with exponential behavior. Furthermore, the bump circuit is enabled to generate an output corresponding to a comparison between an input vector received by the bump circuit and the template vector stored by the bump circuit. Additionally, the analog classifier circuit includes a variable gain amplifier in communication with the bump circuit, and the variable gain amplifier can be adjusted to modify the variance of the template vector.

One of the significant advantages provided by an analog classifier circuit in accordance with the present invention is the ability to independently tune both and the center and the width of the transfer curve of the analog classifier circuit. For example, and not limitation, the analog classifier circuit provided in accordance with an exemplary embodiment of the present invention can therefore be used to implement adaptive learning algorithms with both an adaptive mean (the center of the transfer curve) and an adaptive variance (the width of the transfer curve). More particular, the height, the width, and center of the transfer curve, which represent the maximum likelihood, the variance, and the mean of a template distribution respectively, of an analog classifier circuit in accordance with an exemplary embodiment of the present invention, can be independently programmed. It is the ability to program these parameters in an exemplary embodiment of analog classifier that enables the classifier to fit into different scenarios with the full use of statistical information up to the second moment. In an exemplary embodiment of the present invention, numerous analog classifier circuits can be configured in a vector quantizer system to implement a multivariate probability distribution function with a diagonal covariance matrix. In an exemplary embodiment, the probability distribution with exponential behavior can be a Gaussian or normal distribution. Those of skill in the art will appreciate that reference to a probability distribution with exponential behavior herein can be a Gaussian distribution or other suitable continuous probability distribution. Moreover, this exemplary embodiment of the vector quantizer system can be configured to provide a highly compact and power-efficient programmable analog radial basis function ("RBF") based classifier.

FIG. 1 provides a schematic of an analog classifier circuit 100 in accordance with an exemplary embodiment of the present invention. In the exemplary embodiment depicted in FIG. 1, the analog classifier circuit 100 includes an inverse generation block 105, a fully-differential variable gain amplifier (VGA) 110, and a bump circuit 120. Those of skill in the art will appreciate that the analog classifier circuit 100 can be a fundamental component of a larger quantizer system; thus multiple analog classifier circuits 100 can be configured, along with other components, to create an exemplary embodiment of a vector quantizer system in accordance with the present invention. Furthermore, those of skill in the art will appreciate that the analog classifier circuit 100 shown in FIG. 1 is merely a representative architecture and that many suitable architectures are possible without detracting from the scope of the invention. For example, and not limitation, when the analog classifier circuit 100 is implemented along with other analog classifier circuits 100 in an vector quantizer system, some of the components, such as the inverse generation block 105, can be shared by more than one analog classifier circuit 100. Therefore, the schematic of the analog classifier circuit 100 shown in FIG. 1 can be modified according to various implementation characteristics without detracting from the functionality of the analog classifier circuit 100.

In an exemplary embodiment, the inverse generation block can provide complementary input voltages to the VGA 110, so that the floating-gate common mode voltage of $M_{21}$ and $M_{22}$, as well as the outputs of VGA 110, are independent of input signal common-mode level. The inverse generation block 105 in an exemplary embodiment, can be composed of two floating-gate summing amplifiers that generate complementary input voltages. For example, and not limitation, if the charges $M_{13}$ and $M_{14}$ are matched and the transistors are in the saturation region, the following equality is true:

$$V_{in1}+V_{1c}=V_{in2}+V_{2c}=V_{const}$$

Where $V_{const}$ is only dependent on the bias voltage, $V_b$, and the charges $M_{13}$ and $M_{14}$. In an exemplary embodiment, the outputs of the summing amplifiers of the inverse generation block 105, are fed to floating-gate transistors in the VGA 110 to make the outputs of the VGA 110 independent of the input common-mode signals. In an exemplary embodiment, the operation of the inverse generation block 105 on the floating gate voltages on $M_{21}$ and $M_{22}$ shown in FIG. 1 can be expressed as follows:

$$V_{fg,21} = \frac{1}{2}(V_{in1} + V_{const} - V_{in2}) + \frac{Q_{21}}{C_T}$$
$$= \frac{1}{2}\Delta V_{in} + V_{Q\cdot com} + V_{Q\cdot dm}$$

$$V_{fg,22} = \frac{1}{2}(\Delta V_{in2} + V_{const} - V_{in1}) + \frac{Q_{22}}{C_T}$$
$$= -\frac{1}{2}\Delta V_{in} + V_{Q\cdot cm} - \frac{1}{2}V_{Q\cdot dm},$$

where $V_{in}=V_{in1}-V_{in2}$, $Q_{21}$ and $Q_{22}$ are the amounts of charge on $M_{21}$ and $M_{22}$ respectively, CT is the total capacitance seen from a floating gate, and $$V_{Q\cdot cm} = -\frac{1}{2}\left(\frac{Q_{21} + Q_{22}}{C_T} + V_{const}\right)$$
$$V_{Q\cdot dm} = \frac{Q_{21} + Q_{22}}{C_T}$$

Thus, in an exemplary embodiment the two floating-gate voltages are not dependent on the input signal common-mode level. The variable gain of the VGA 110 is derived from the nonlinearity of the transfer function from the floating gate voltage, $V_{fg21}$ (or $V_{fg22}$), to the diode-connected voltage, $V_1$ (or $V_2$).

In an exemplary embodiment of the analog classifier circuit 100, the height of the bell-shaped transfer curve is set by the tail current, $I_b$, of the bump circuit 120. Additionally, in an exemplary embodiment of the analog classifier circuit 100 the magnitude of the VGA gain decreases exponentially with the common-mode charge on $M_{21}$ and $M_{22}$ and the bell-shaped transfer curve increases exponentially. In an exemplary embodiment, the differential charge on $M_{21}$ and $M_{22}$ can be programmed to vary the center (or mean) of the bell-shaped transfer curve. Additionally, in an exemplary embodiment, the common-mode charge can be programmed to vary the width (or variance) of the bell-shaped transfer. The ability to independently tune both the center and the width of the transfer curve of the analog classifier circuit 100 provides one of the significant advantages of an exemplary embodiment of the present invention. As the pair of floating gate transistors of the exemplary embodiment of the analog classifier circuit 100 shown in FIG. 1 store the template vectors used in classification, the analog classifier circuit 100 can therefore be used to implement adaptive learning algorithms with both an adaptive mean (the center of the transfer curve) and an adaptive variance (the width of the transfer curve).

Figure 2A:
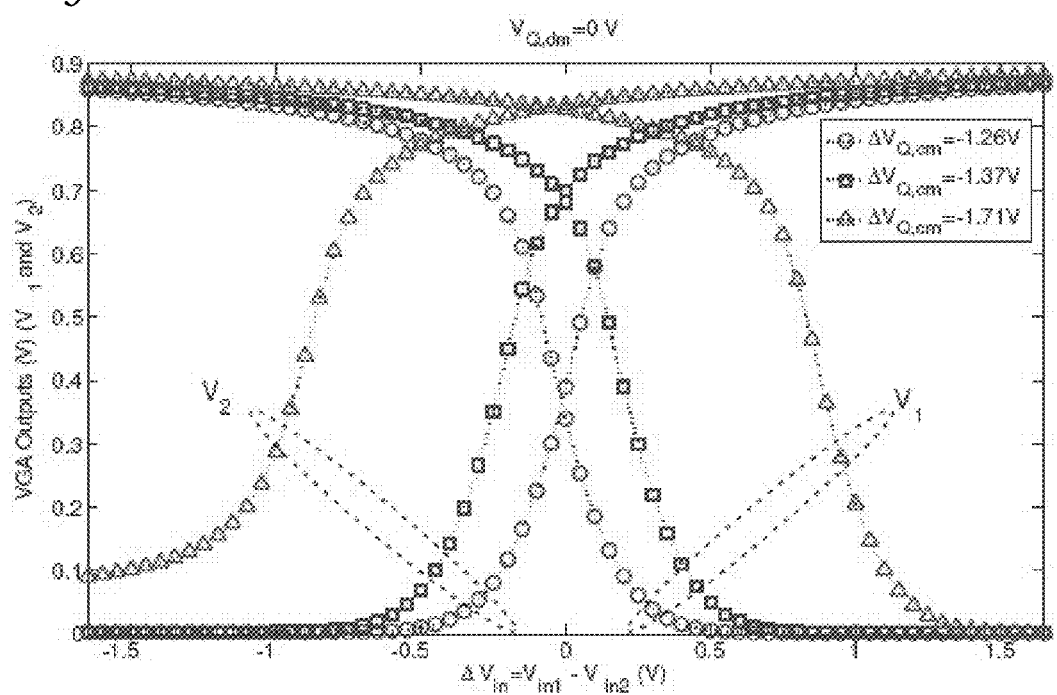
FIGS. 2A and 2B provide two graphs of the various transfer characteristics of the VGA 110 of an analog classifier circuit 100 in accordance with an exemplary embodiment of the present invention.
Figure 2B:
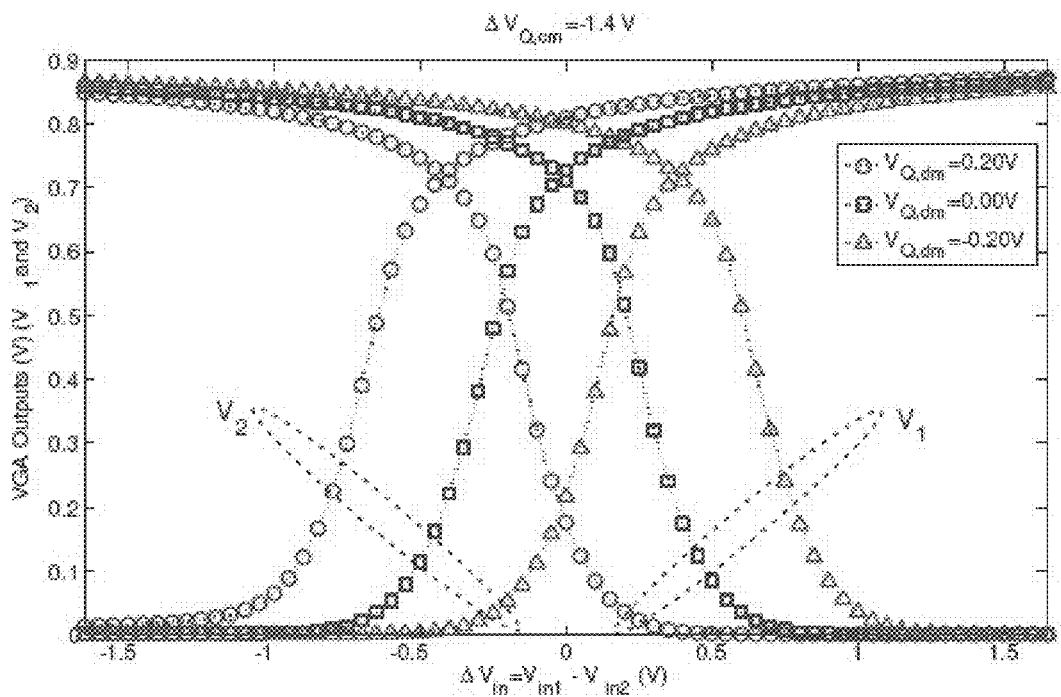

In an exemplary embodiment analog classifier circuit 100 can be configured to perform unsupervised learning. In this exemplary embodiment, the analog classifier circuit 100 can learn the template information that is appropriate for a given classification application. In one embodiment, the analog classifier circuit 100 can be configured to modify the template vector based upon the input vector. For example, and not limitation, in many implementations the characteristics of the input vectors to be received will be unknown; thus, it will be difficult for the FIGS. 2A and 2B provide two graphs of the various transfer characteristics of the VGA 110 of an analog classifier circuit 100 in accordance with an exemplary embodiment of the present invention. Several pairs of transfer curves corresponding to different amounts of charge on the floating gates of the VGA 110 are measured and are shown in FIGS. 2A and 2B. FIG. 2A provides a graph of the effect of the common-mode charge on $M_{21}$ and $M_{22}$. As shown in FIG. 2A, the slopes at the intersection point are dependent on the common-mode charge while the value of $\Delta V_{in}$ at the intersection is not dependent on the common-mode charge. Therefore, in an exemplary embodiment of the analog classifier circuit 100, the common-mode charge can be programmed to tune the width of the bell-shaped transfer characteristics without affecting the center. FIG. 2B provides a graph of the effect of the differential charge on $M_{21}$ and $M_{22}$. As shown in FIG. 2B, the value of $\Delta V_{in}$ at the intersection point is dependent upon the differential charge but the slopes at the intersection are invariant. Therefore, in an exemplary embodiment of the analog classifier circuit 100, the center of the transfer function can be tuned without altering the width by programming the differential charge.

Figure 3A:
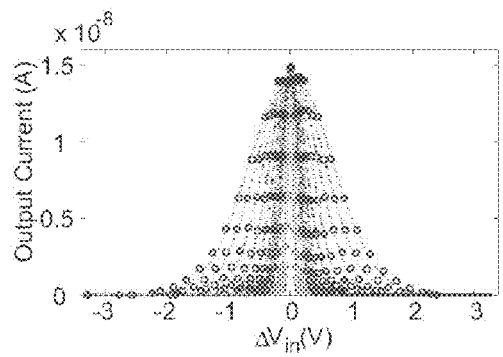
FIGS. 3A-3F provide graphs of various responses of a vector quantizer system 200 in accordance with an exemplary embodiment of the present invention.
Figure 3B:
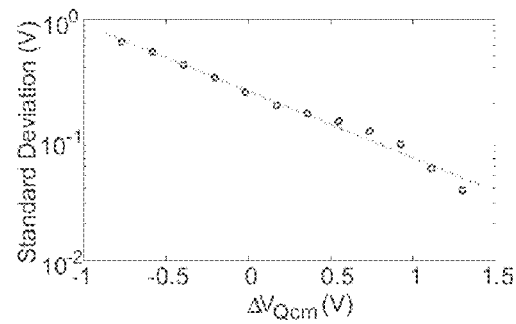

FIGS. 3A-3F provide graphs of various responses of a vector quantizer system 200 in accordance with an exemplary embodiment of the present invention. In an exemplary embodiment, the vector quantizer system 200 can consist of a 16×16 array of analog classifier circuits 100 configured on a single chip and fabricated in a 0.5 μm CMOS process. For this exemplary embodiment of vector quantizer system 200, the common mode charge of the bump circuit 120 is programmed to several levels and the measured results can be compared to the corresponding Gaussian fits. FIG. 3A illustrates a comparison of the measured transfer curves from an exemplary embodiment of the vector quantizer system 200 (in circles) and the corresponding Gaussian fits (dashed lines). FIG. 3B provides a graph of the relation between the common-mode charge related voltage ($\Delta V_{Qcm}$ (V)) and the extracted standard deviation of an exemplary embodiment of the vector quantizer system 200. In an exemplary embodiment, the minimum standard deviation of an analog classifier circuit 100 is 40 mV. For example, and not limitation, in an exemplary embodiment two diode-connected NMOS transistors can be used to load the VGA 110 of an analog classifier circuit 100 to reduce the minimum achievable width of the transfer curve.

Figure 3C:
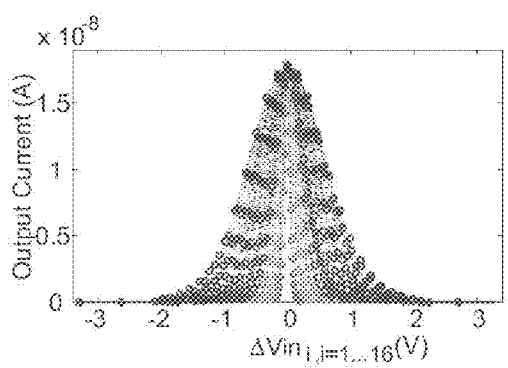
Figure 3D:
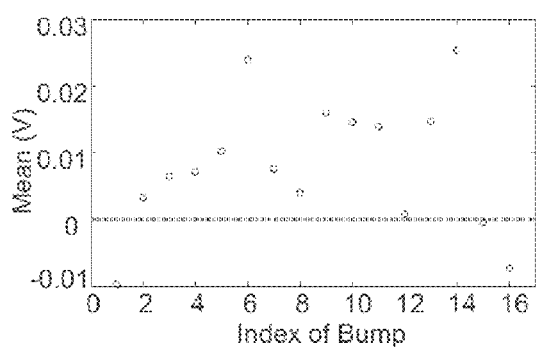
Figure 3E:
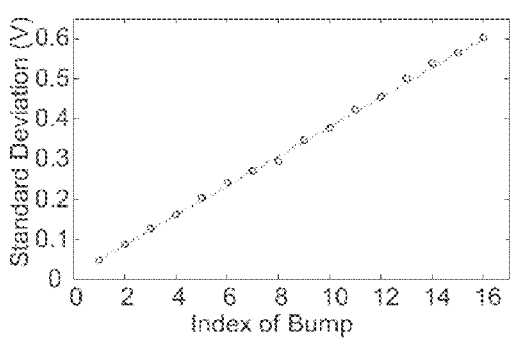
Figure 3F:
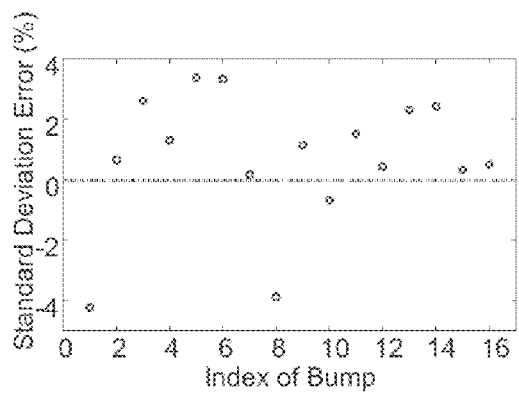

In an exemplary embodiment, the vector quantizer system 200, consisting of a 16×16 array of analog classifier circuits 100, can undergo a characterization process in which the analog classifier circuits 100 are precisely programmed to have linearly variant widths. FIG. 3C provides a graph of the resulting response characteristics of the 16 different analog classifier circuits 100 programmed in the vector quantizer system 200 in an exemplary embodiment. FIG. 3D illustrates the programming accuracy of the array of different analog classifier circuits 100 in same template of the exemplary embodiment of the vector quantizer system 200. More particularly, FIG. 3D illustrates that the offsets (graphed in circles) of the analog classifier circuits 100 in this exemplary embodiment are within 26 mV. FIG. 3E provides an illustration of the measured standard deviations from the exemplary embodiment of the vector quantizer system 200 in comparison to the target values. As illustrated in FIG. 3E, the measured standard deviations provide a reasonably strict correlation to the target values. FIG. 3F provides an illustration of the errors of the extracted standard deviations shown in FIG. 3E. FIG. 3F illustrates that the standard deviation errors for the programmed exemplary embodiment of the vector quantizer system 200 are less than 5%.

Figure 4:
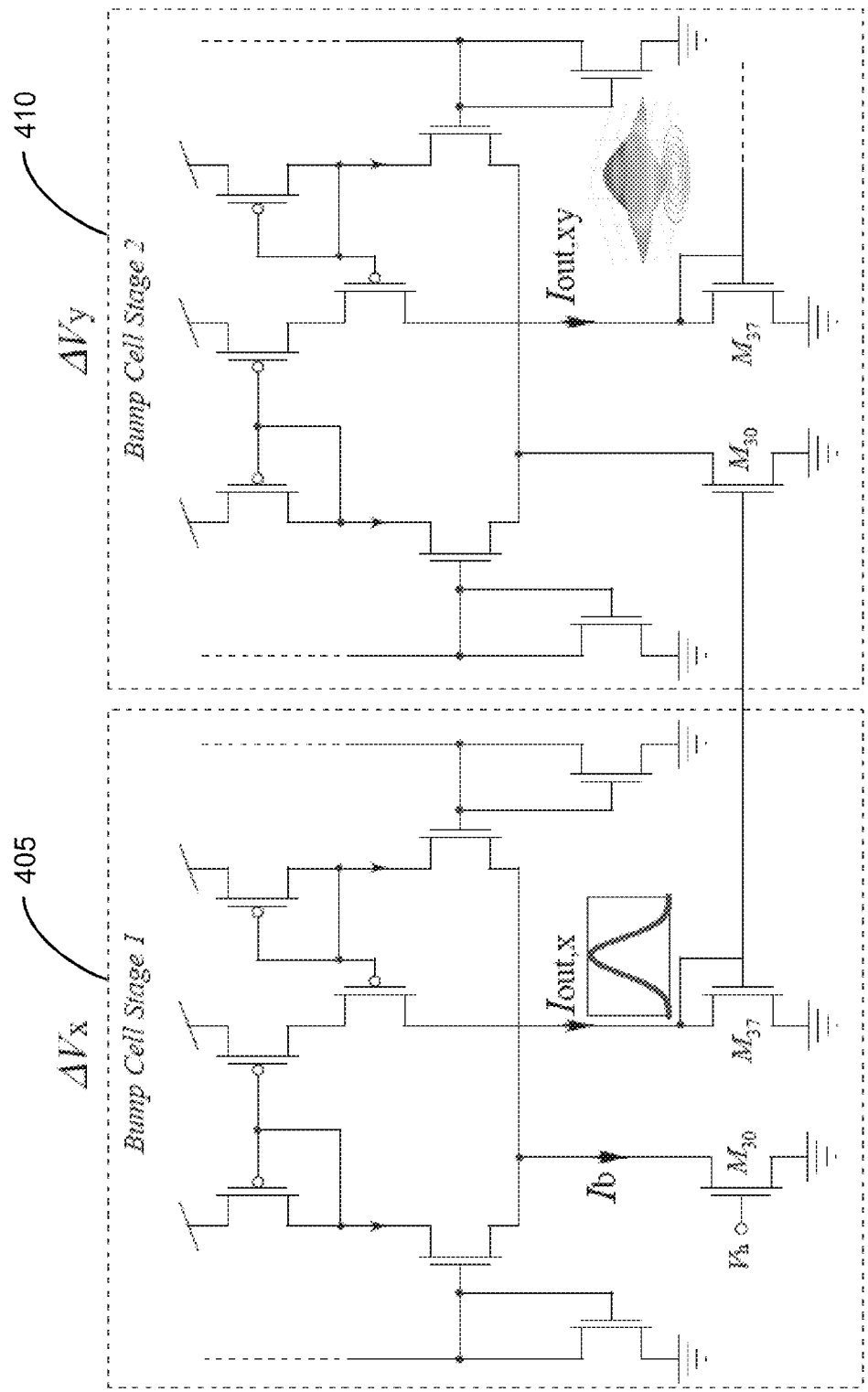
FIG. 4 provides an illustration of vector quantizer system 200 with cascaded analog classifier circuits 100 in accordance with an exemplary embodiment of the present invention.

FIG. 4 provides an illustration of vector quantizer system 200 with cascaded analog classifier circuits 100 in accordance with an exemplary embodiment of the present invention. One significant advantage provided an exemplary embodiment of the vector quantizer system 200 enabled by the present invention is that a multivariate probability distribution function with a diagonal covariance matrix can be approximately realized by cascading the bump circuits, such as 405 and 410, of the analog classifier circuits 100 of the vector quantizer system 200. For example, and not limitation, a bivariate Gaussian function can be expressed and approximated as:

$$f(\Delta x, \Delta y) = e^{\frac{\Delta x^2}{2\sigma_x^2} \frac{\Delta y^2}{2\sigma_y^2}}$$
$$= e^{\frac{\Delta x^2}{2\sigma_x^2}} \cdot e^{\frac{\Delta y^2}{2\sigma_y^2}}$$
$$\approx I_{out}(\Delta V_X, \Delta V_Y)$$
$$= I_b \cdot \operatorname{sec} h^2\left(\frac{k\eta_x \Delta V_x}{2U_T}\right) \cdot \operatorname{sec} h^2\left(\frac{k\eta_y \Delta V_y}{2U_T}\right)$$
$$= I_{out,x} \cdot \operatorname{sec} h^2\left(\frac{k\eta_y \Delta V_y}{2U_T}\right)$$

where $I_b$ is the input tail current of the first stage, $\Delta V_x$ and $\Delta V_y$ are the input signal of the first and second stages respectively, $\acute{\eta}_x$ and $\acute{\eta}_y$ are the values of the VGA gain. As shown in the exemplary embodiment depicted in FIG. 4, the output current of the bump circuit 405 of a first analog classifier circuit 100 can be fed into the input of the bump circuit 410 a second analog classifier circuit 100. More particularly, in the exemplary embodiment depicted in FIG. 4, the first stage output current of bump circuit 405 is converted to a voltage by diode-connected transistor $M_{37}$. In this exemplary embodiment, the output voltage can be fed to a tail transistor, $M_{30}$, in the second bump circuit 410. In this configuration, the maximum value of the output current is set by the first stage tail current, Ib. The feature dimension in an exemplary embodiment can be increased by cascading more floating-gate bump circuits.

In an exemplary embodiment vector quantizer system 200 can be configured to perform unsupervised learning. In this exemplary embodiment, the vector quantizer system 200 can learn the template information that is appropriate for each template vector for each analog classifier circuit 100 for a given classification application. In one embodiment, the vector quantizer system 200 can be configured to modify the template vector based upon the input vectors received by the vector quantizer system 200.

The vector quantizer system 200 can be configured in an exemplary embodiment to perform various classification algorithms. For example, and not limitation, the vector quantizer system 200 can be configured to perform a Gaussian Mixture Model (GMM) algorithm or other classification algorithm. In an exemplary embodiment, the vector quantizer system 200 is an ideal solution because the outputs of the analog classifier circuits 100 are currents that can be summed up easily without consuming complicated hardware and power.

Figure 5B:
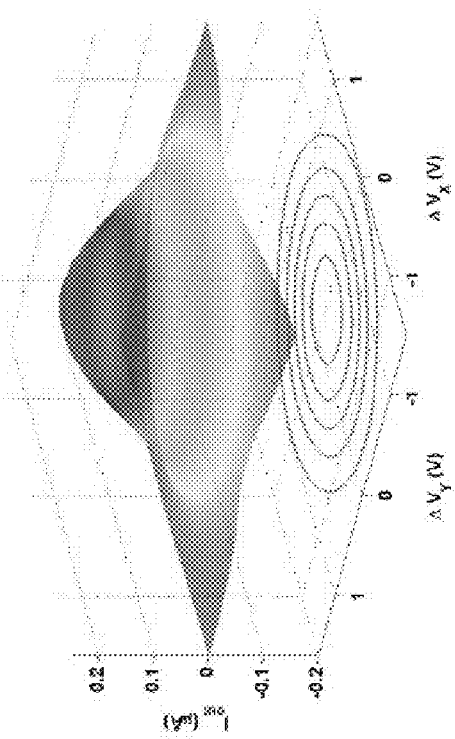
FIGS. 5A-B provide graphs of the measured results of a bivariate implementation of a vector quantizer system 200 in accordance with an exemplary embodiment of the present invention.
Figure 5A:
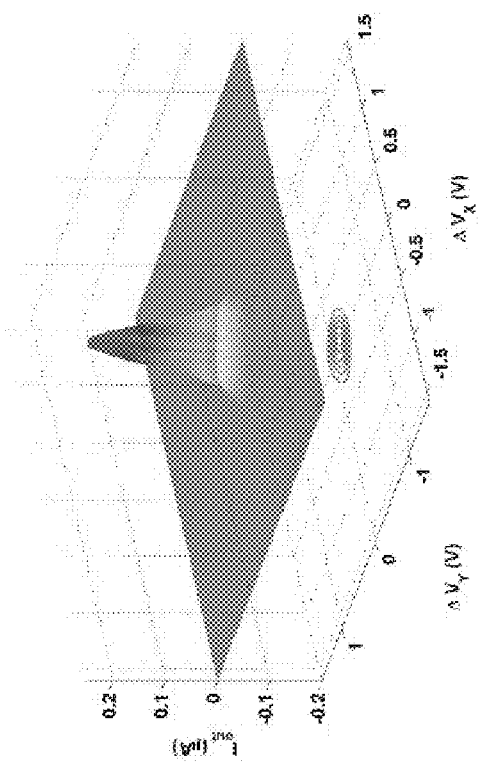

FIGS. 5A-B provide graphs of the measured results of a bivariate implementation of a vector quantizer system 200 in accordance with an exemplary embodiment of the present invention. In an exemplary embodiment, vector quantizer system 200 contains an array of 16 analog classifier circuits 100 and any two the 16 bump circuits of the analog classifier circuits 100 can be swept in a 2-D space while others remain constant to visualize the resulting bivariate distribution in a 3-D plot. FIG. 5A provides a 3-D plot measured by sweeping the first and 16th bump circuits of the analog classifier circuit 100 of an exemplary embodiment of the vector quantizer system 200. FIG. 5B provides a 3-D plot measured by sweeping the 15th and 16th bump circuits of the analog classifier circuit 100 of an exemplary embodiment of the vector quantizer system 200.

Figure 6:
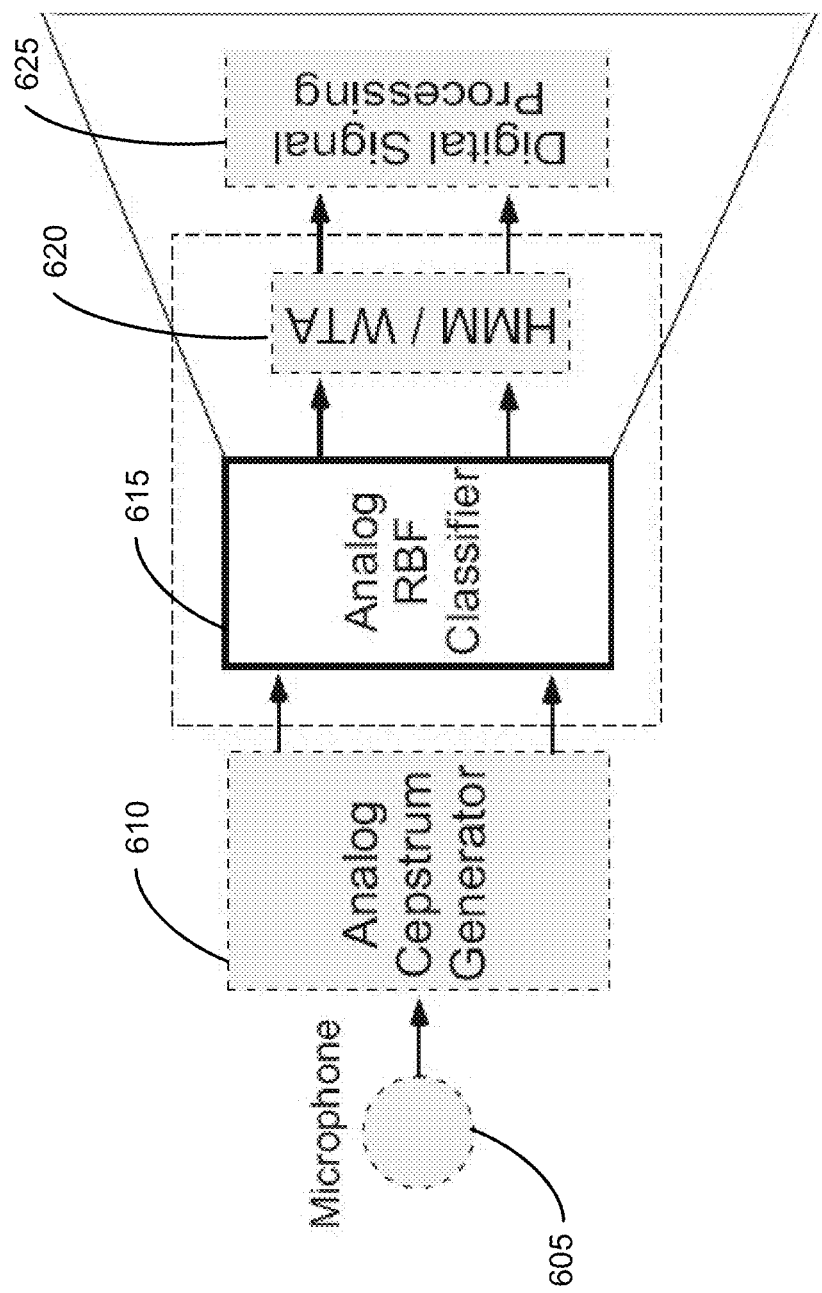
FIG. 6 provides a block diagram of the front-end for a speech recognition device, which includes a vector quantizer system 200 in accordance with an exemplary embodiment of the present invention.

FIG. 6 provides a block diagram of the front-end for a speech recognition device, which includes a vector quantizer system 200 in accordance with an exemplary embodiment of the present invention. In an exemplary embodiment, a vector quantizer system 200 can be configured to provide an analog Radial Basis Function (RBF) classifier. As shown in FIG. 6, the front-end of a speech recognition device can be configured to include a microphone 605, an analog cepstrum generator 610, an analog RBF classifier 615, a continuous time Hidden Markov Model (HMM) block, built from programmable analog waveguide stages, and Winner Take All (WTA) circuit 620. Thereby, in the exemplary embodiment depicted in FIG. 6, input from the microphone 605 can be processed and classified before being input into the digital signal processing logic 625. By relying upon the exemplary embodiment of the analog RBF classifier 615 enabled by the present invention to perform analog signal processing in the front-end, the computational load of the subsequent digital signal processing logic 625 can be reduced. Additionally, in an exemplary embodiment, the required specification of the analog-to-digital converters can be relaxed in terms of speed, accuracy, or both. As a result the entire system can be more power efficient.

Figure 7:
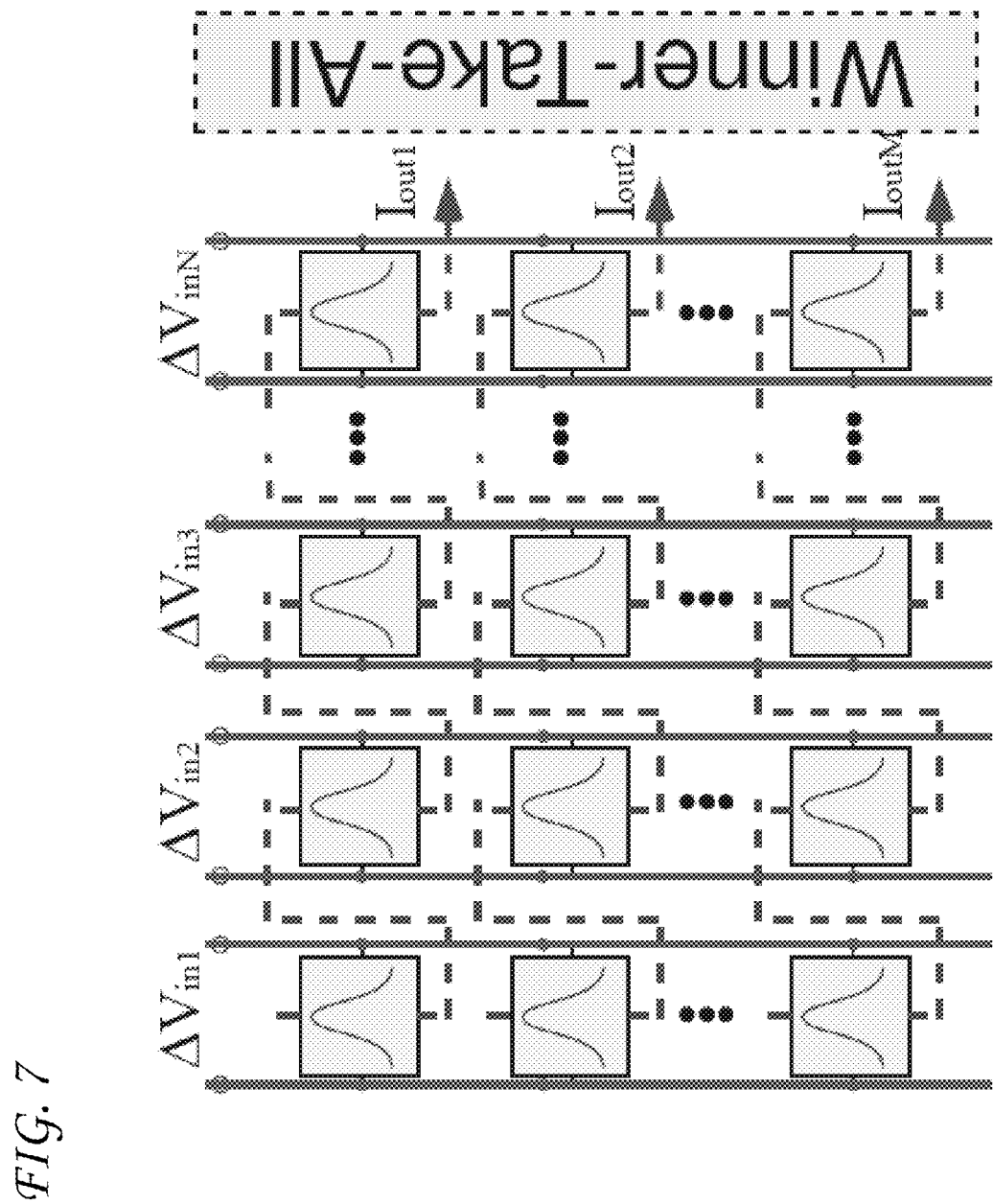
FIG. 7 provides a block diagram of the vector quantizer system 200 in accordance with an exemplary embodiment of the present invention.

FIG. 7 provides a block diagram of the vector quantizer system 200 in accordance with an exemplary embodiment of the present invention. As shown in the block diagram of FIG. 7, the vector quantizer system 200 can be configured to contain an array of analog classifier circuits 100 which are connected to a Winner-Take-All circuit. In an exemplary embodiment, of the vector quantizer system 200, the Winner-Take-All circuit can compare the output currents of the numerous analog classifier circuits 100 and determine the winning template.

Figure 8:
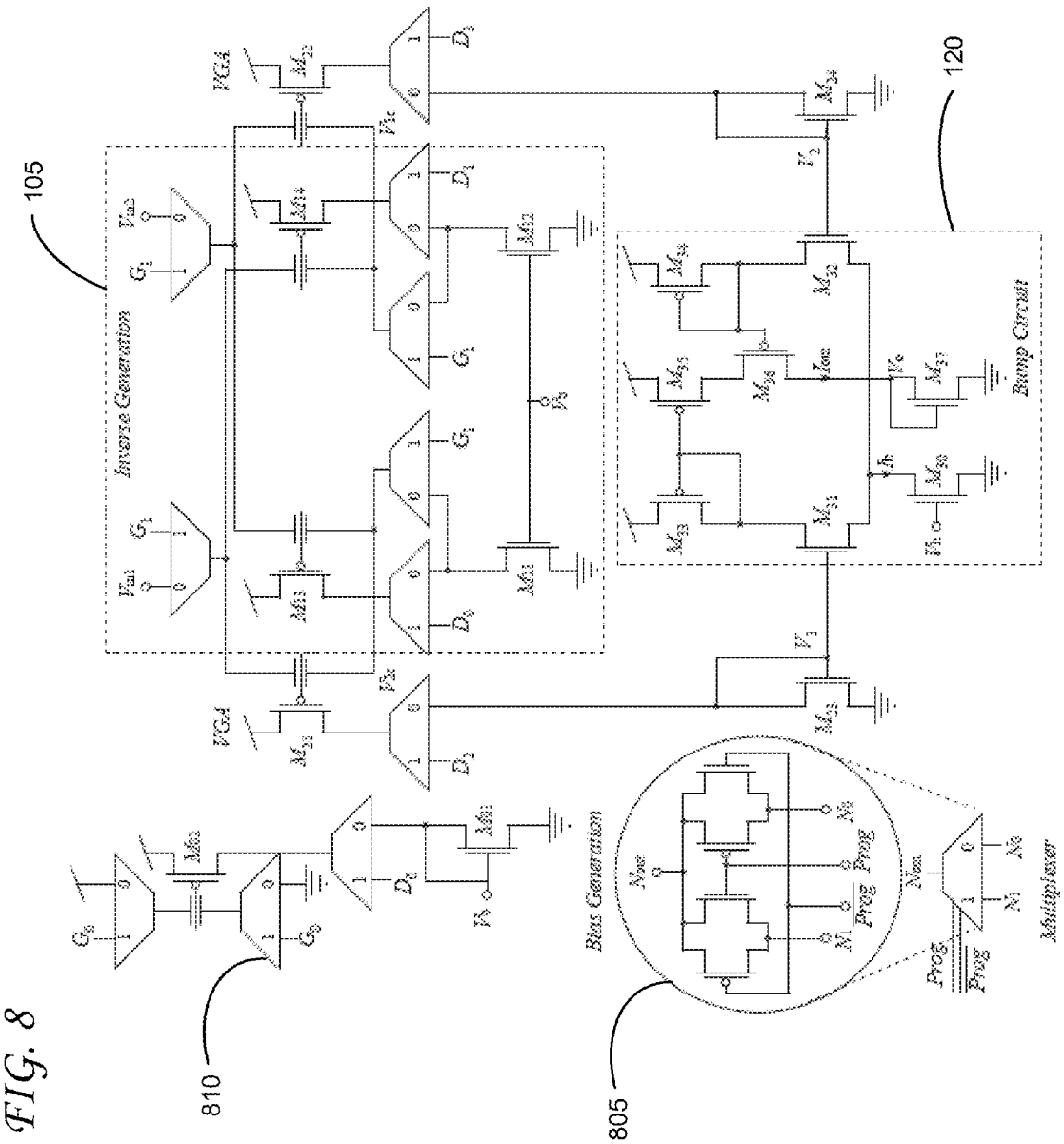
FIG. 8 provides a schematic of the vector quantizer system 200 in accordance with an exemplary embodiment of the present invention.

FIG. 8 provides a schematic of the vector quantizer system 200 in accordance with an exemplary embodiment of the present invention. The exemplary embodiment of the vector quantizer system 200 depicted in FIG. 8 includes a plurality of multiplexers 805. FIG. 8 provides a detailed view of the layout of an exemplary embodiment of the multiplexer 805. The inclusion of a plurality of multiplexers 805 into the vector quantizer system 200 enables the analog classifier circuits 100 to be switched between an operation mode and a programming mode. For example, and not limitation, when the multiplexer 805 is set to a value of "1," the associated analog classifier circuit 100 can be in the programming mode and when the multiplexer 805 is set to a value of "0," the associated analog classifier circuit 100 can be in the operating mode.

As illustrated in the exemplary embodiment shown in FIG. 8, the vector quantizer system 200 can be configured such that the inverse generation block 105 can be shared by bump circuits 120 located in the same column of an array of the vector quantizer system 200. Those of skill in the art will appreciate that there are a variety of different configurations for the analog classifier circuits 100 of the vector quantizer system 200 and thus the components, such as the inverse generation block 105 and multiplexer 805, can vary according to the desired configuration. In the exemplary embodiment depicted in FIG. 8, the number of inverse generations blocks 105 in the vector quantizer system 200 can be equivalent to the feature space dimensions. In the exemplary embodiment shown in FIG. 8, the vector quantizer system 200 can also include a bias generation circuit 810. In the exemplary embodiment shown in FIG. 8, the vector quantizer system 200 only requires one bias generation circuit 810. Those of skill in the art will appreciate that the scalability of the analog classifier circuits 100 used in the vector quantizer system 200 provides numerous advantages relating to compactness of the device and power efficiencies.

Figure 9A:
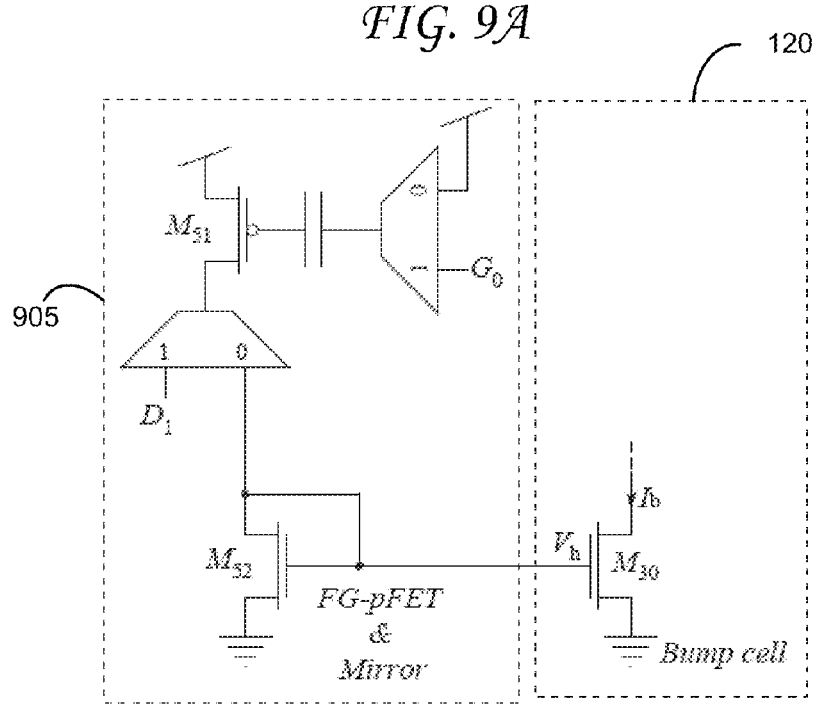
FIG. 9A provides a schematic of an FG-pFET & Mirror block 905 and a portion of a bump circuit 120 in accordance with an exemplary embodiment of the present invention.

FIG. 9A provides a schematic of an FG-pFET & Mirror block 905 and a portion of a bump circuit 120 in accordance with an exemplary embodiment of the present invention. In an exemplary embodiment of the bump circuit 120, the tail current of the preceding bump circuit sets the maximum likelihood for the bump circuit. Therefore, in certain embodiment a FG-pFET & Mirror block 905 is configured before the first bump circuit 120 in a row of an array of bump circuits 120 in a vector quantizer system 200. Thus, in an exemplary embodiment, the FG-pFET & Mirror block 905 can be used to control the maximum likelihood of each template in the vector quantizer system 200.

Figure 9B:
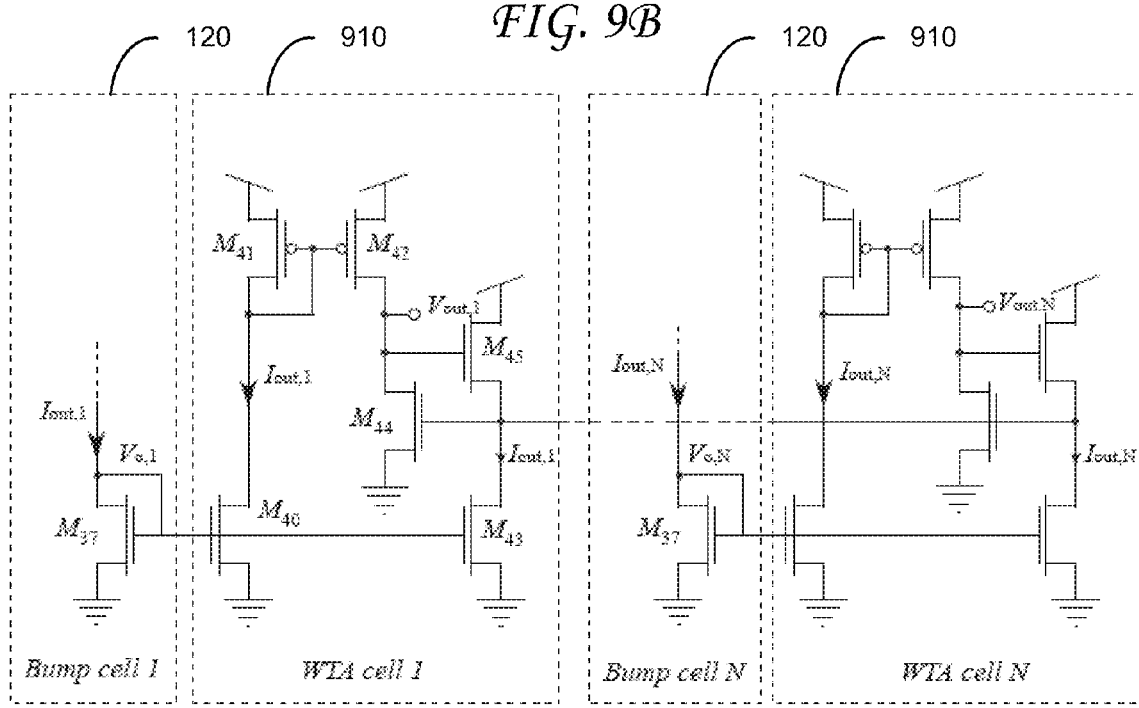
FIG. 9B provides a schematic of two Winner-Take-All (WTA) cells 910 in accordance with an exemplary embodiment of the present invention.

FIG. 9B provides a schematic of two Winner-Take-All (WTA) cells 910 in accordance with an exemplary embodiment of the present invention. In an exemplary embodiment of the present invention, the vector quantizer system 200 can be configured such that the last bump circuit 120 in a row of the array of the vector quantizer system 200 can provide an input to a WTA cell 910. In some implementations of the vector quantizer system 200, the WTA cell 910 can be configured such that the output voltage of the winning cell is high to indicate the best matching template.

Figure 10:
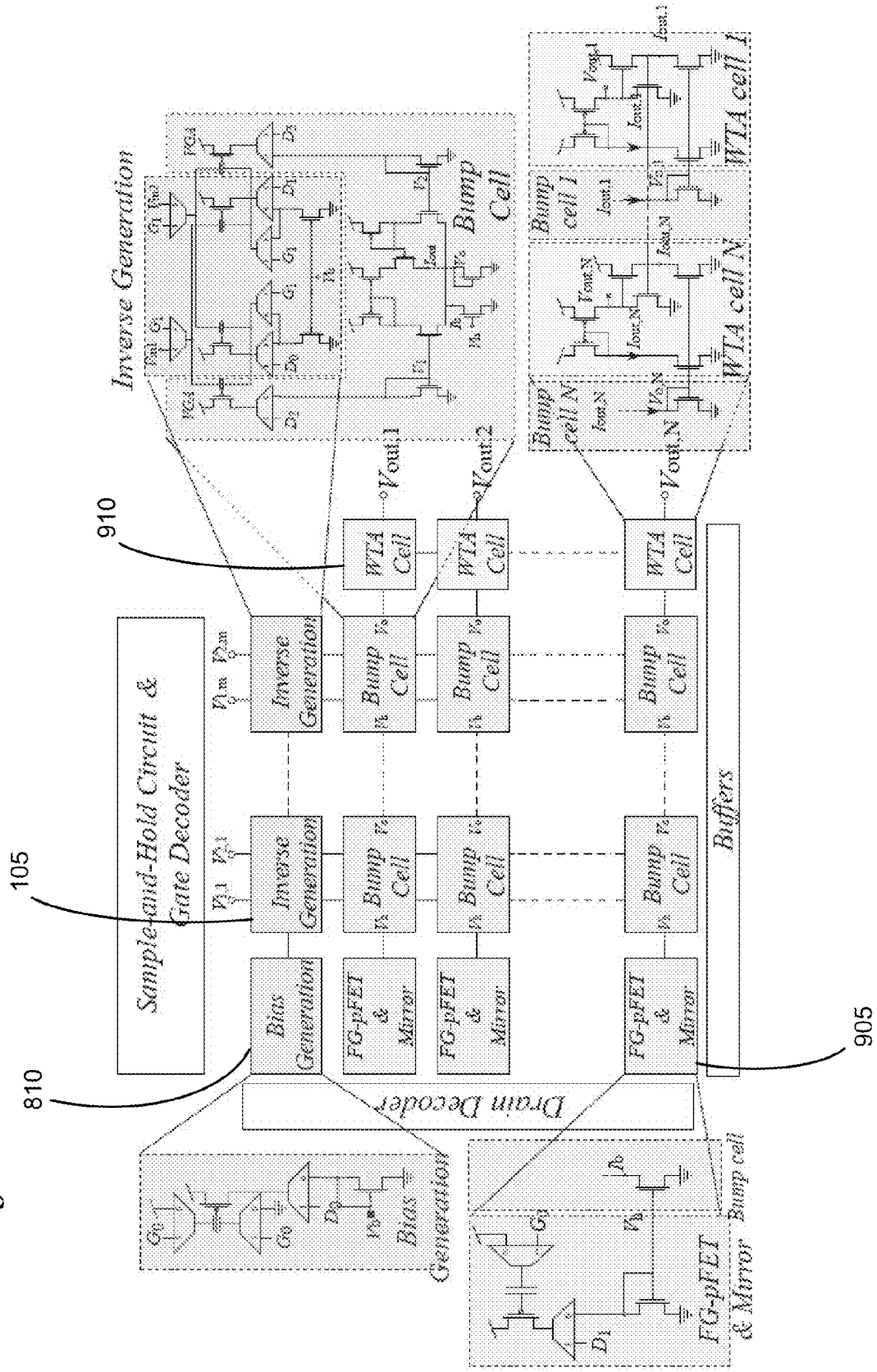
FIG. 10 provides a block diagram of a vector quantizer system 200 in accordance with an exemplary embodiment of the present invention.

FIG. 10 provides a block diagram of a vector quantizer system 200 in accordance with an exemplary embodiment of the present invention. The architecture of the exemplary embodiment of the vector quantizer system 200 shown in FIG. 10 creates a dimensional array of analog classifier circuits 100. As shown in the insert schematic drawing for the analog classifier circuits 100, the analog classifier circuits 100 of the exemplary embodiment shown in FIG. 10 can be configured with a bump circuit 120 and a VGA 110, and configured to share an inverse generation block 105 at the top of each column. Furthermore, as shown in FIG. 10, an FG-pFET & Mirror block 905 can be configured at the beginning of each row of the array of analog classifier circuits 100 to control the maximum likelihood of each template in the vector quantizer system 200. Furthermore, the exemplary embodiment of the vector quantizer system 200 can include a bias generation circuit 810 at the top of the array. Additionally, WTA cells 910 can be configured to receive input from the last bump circuit 120 in each array of the vector quantizer system 200. In the exemplary embodiment of the vector quantizer system 200, the WTA cell 910 with the best-matching template can be configured to output that template to the downstream digital signal processing logic.

In an exemplary embodiment of the vector quantizer system 200 can be configured such that the programming overhead circuitries are at the peripheries of the array of analog classifier circuits 100. Therefore, in an exemplary embodiment, the vector quantizer system 200 can easily scaled up, while maintaining a reasonably high degree of compactness.

Figure 11:
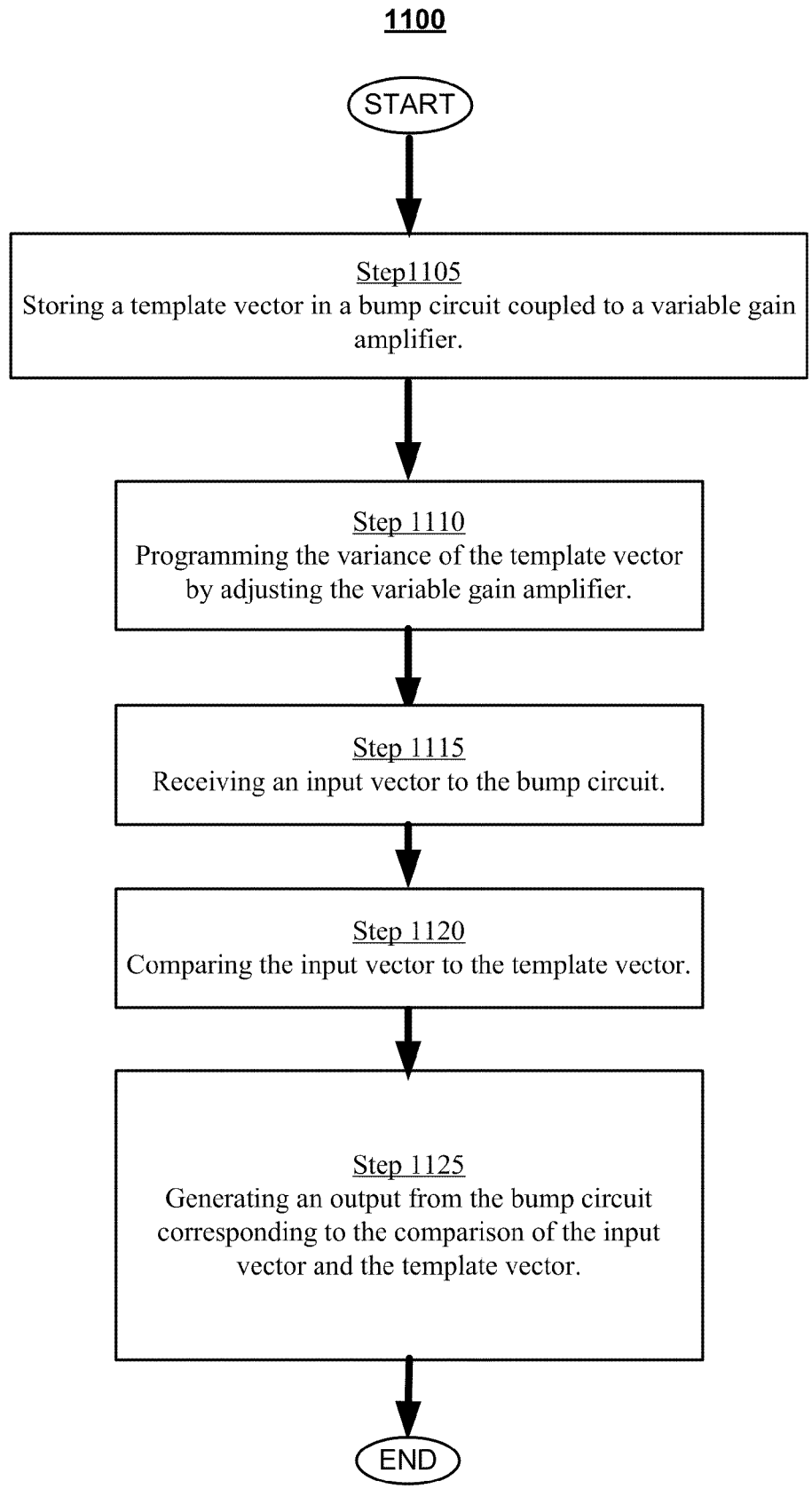
FIG. 11 provides a block diagram of a method of information classification 1100 in accordance with an exemplary embodiment of the present invention.

FIG. 11 provides a block diagram of a method of information classification 1100 in accordance with an exemplary embodiment of the present invention. In an exemplary embodiment, step one 1105 of the method of information classification 1100 involves storing a template vector in a bump circuit coupled to a variable gain amplifier. Step two 110 involves programming the variance of the template vector by adjusting the variable gain amplifier. Additionally, step three 1115 involves receiving an input vector to the bump circuit and step four 1120 compares the input vector to the template vector. Once the comparison is made, step five 1125 involves generating an output from the bump circuit corresponding to the comparison of the input vector and the template vector.

In an exemplary embodiment of the method of information classification 1100, the output from the bump circuit can be at least partially dependent upon the difference in the variance of the input vector and the variance of the template vector. Furthermore, in an exemplary embodiment of the method of information classification 1100, the output from the bump circuit can be at least partially dependent upon the difference in the mean of the input vector and the mean of the template vector. Additionally, in an exemplary embodiment of the method of information classification 1100, the output from the bump circuit can be at least partially dependent upon the difference in the maximum likelihood of the input vector and the maximum likelihood of the template vector. In alternative embodiment of the method of information classification 1100, the method 1100 further includes the steps of performing unsupervised learning to determine the appropriate template vector based on the input vector and adjusting the variance of the template vector based upon the unsupervised learning.

Figure 12:
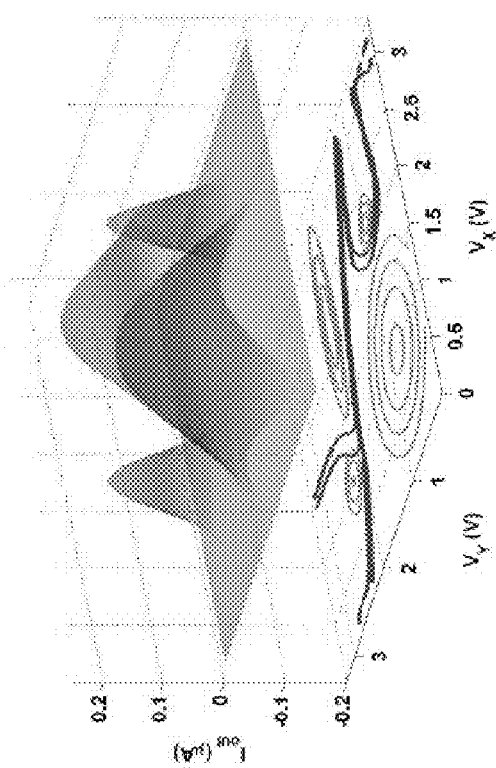
FIG. 12 provides graphs of the configurable classification results of a vector quantizer system 200 in accordance with an exemplary embodiment of the present invention.
Figure 12:
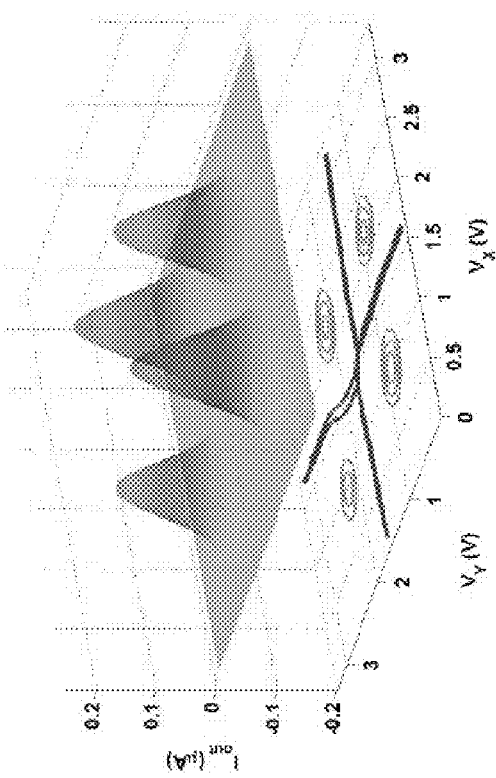

FIG. 12 provides graphs of the configurable classification results of a vector quantizer system 200 in accordance with an exemplary embodiment of the present invention. The graphs shown in FIG. 12 illustrate the use of four templates in an exemplary embodiment of the vector quantizer system 200 and the reconfigurability of the analog classifier circuits 100 in the vector quantizer system 200. The four bell graphs represent the four bell shaped output currents that approximate the bivariate Gaussian likelihood functions of four templates. The thick solid liens at the bottom of the graph indicate the boundaries determined by the WTA cell outputs of the exemplary embodiment of the vector quantizer system 200.

Figure 13B:
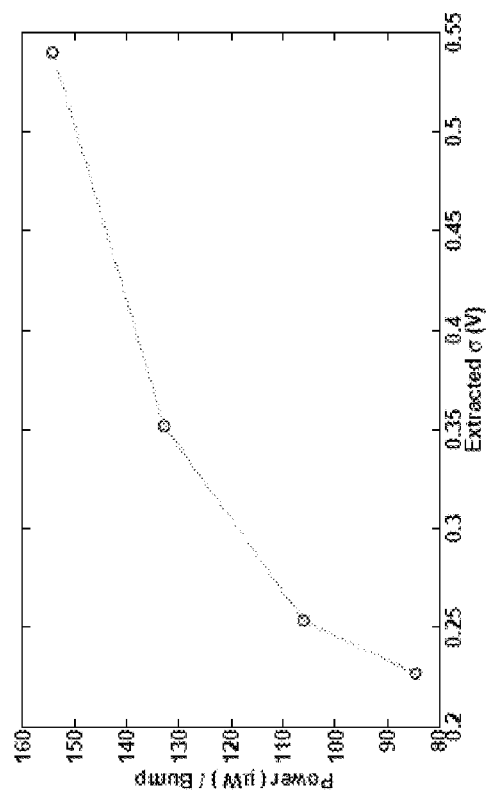
FIGS. 13A-B provide graphs of the power consumption of a vector quantizer system 200 in accordance with an exemplary embodiment of the present invention.
Figure 13A:
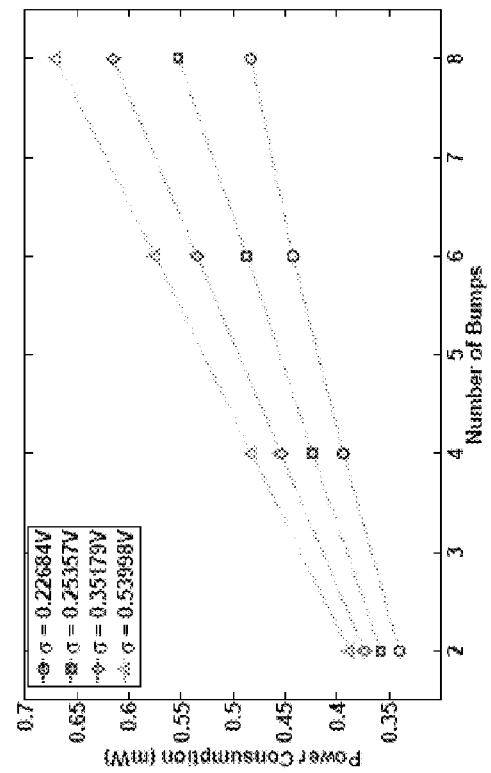

FIGS. 13A-B provide graphs of the power consumption of a vector quantizer system 200 in accordance with an exemplary embodiment of the present invention. FIG. 13A illustrates the average power consumption versus the number of activated analog classifier circuits 100 in an exemplary embodiment of the vector quantizer system 200. The slope of the curve in FIG. 13A indicates the average power consumption per analog classifier circuit 100 for a specific value of the width. FIG. 13B illustrates the average power consumption versus the standard deviation. As shown in FIG. 13B, greater variance in the Gaussian distribution approximated by a particular analog classifier circuit 100 results in greater power consumption.

Figure 14B:
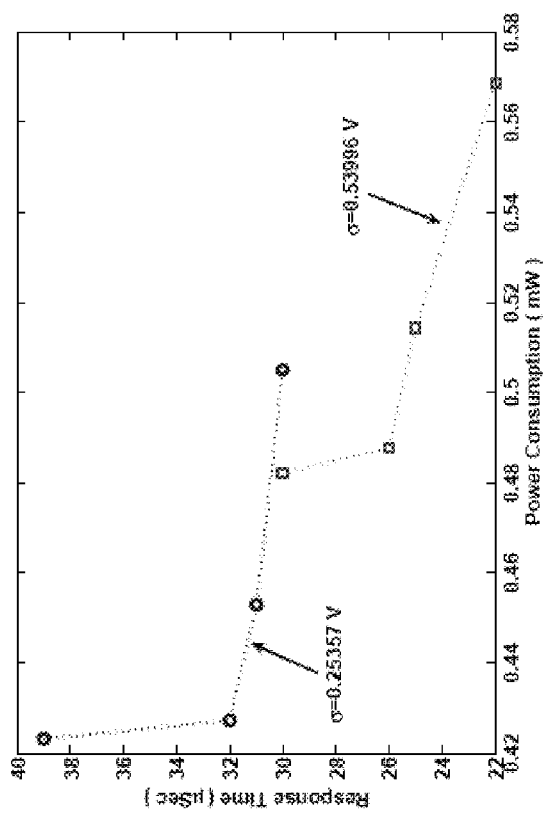
FIGS. 14A-B provide graphs of transient response and the power consumption of a vector quantizer system 200 in accordance with an exemplary embodiment of the present invention.
Figure 14A:
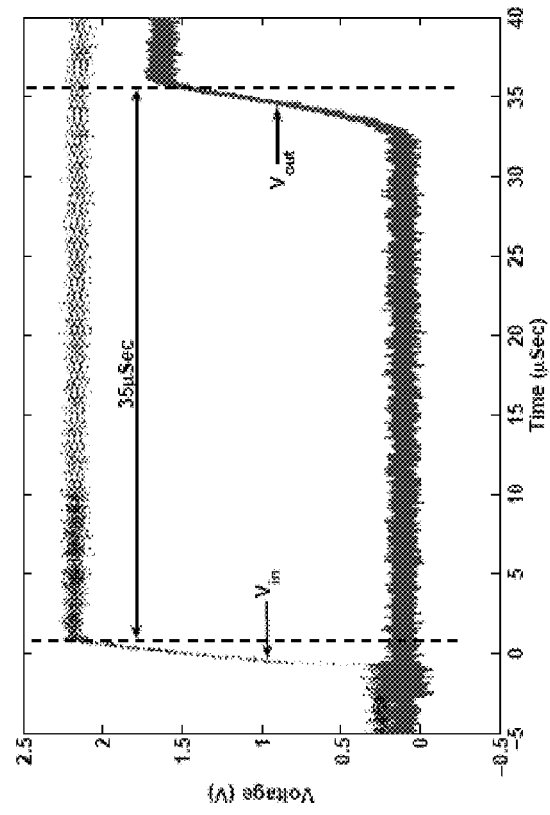

FIGS. 14A-B provide graphs of transient response and the power consumption of a vector quantizer system 200 in accordance with an exemplary embodiment of the present invention. FIG. 14A illustrates the transient response of an exemplary embodiment of the vector quantizer system 200. FIG. 14B illustrates the response time versus power consumption of an exemplary embodiment of the vector quantizer system 200.

Figure 15:
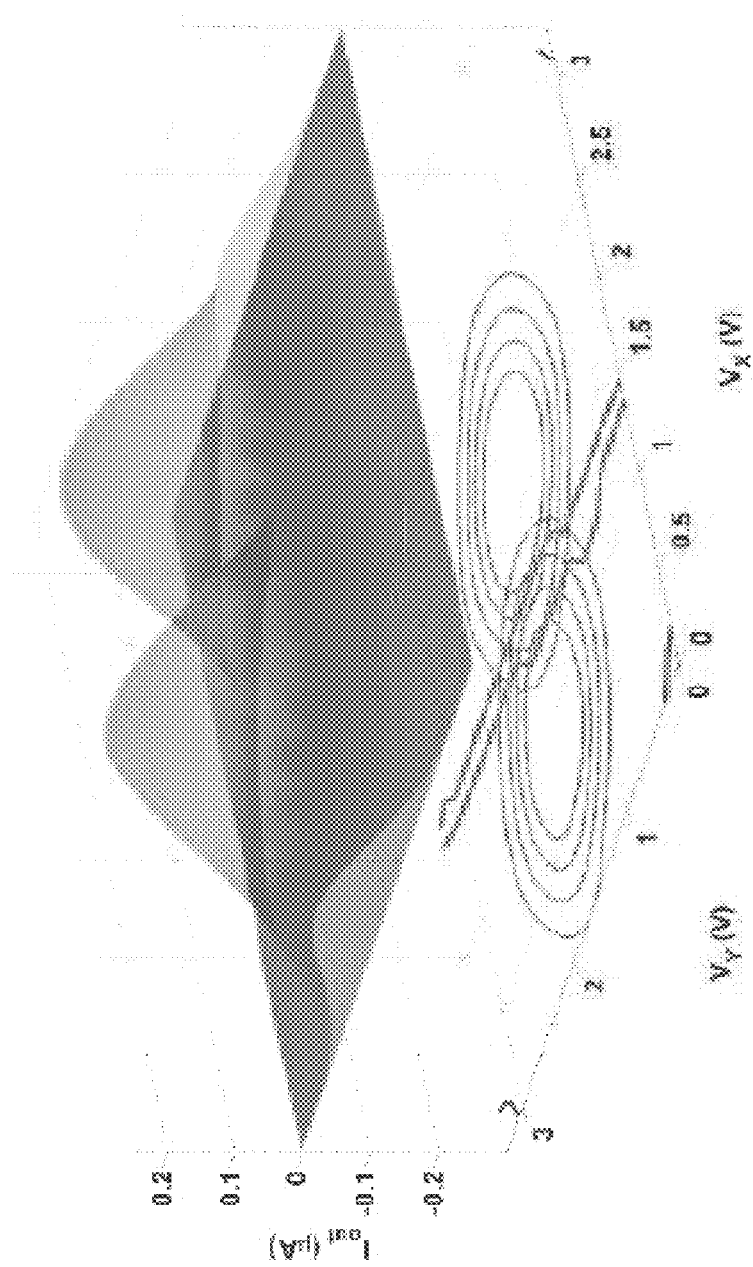
FIG. 15 provides a graph of the distribution of two analog classifier circuits 100 used to evaluate the classifier performance.

FIG. 15 provides a graph of the distribution of two analog classifier circuits 100 used to evaluate the classifier performance. For the graph shown in FIG. 15, two separate analog classifier circuits 100 were programmed to have the same variance with a separation of 1.2V.

Figure 16:
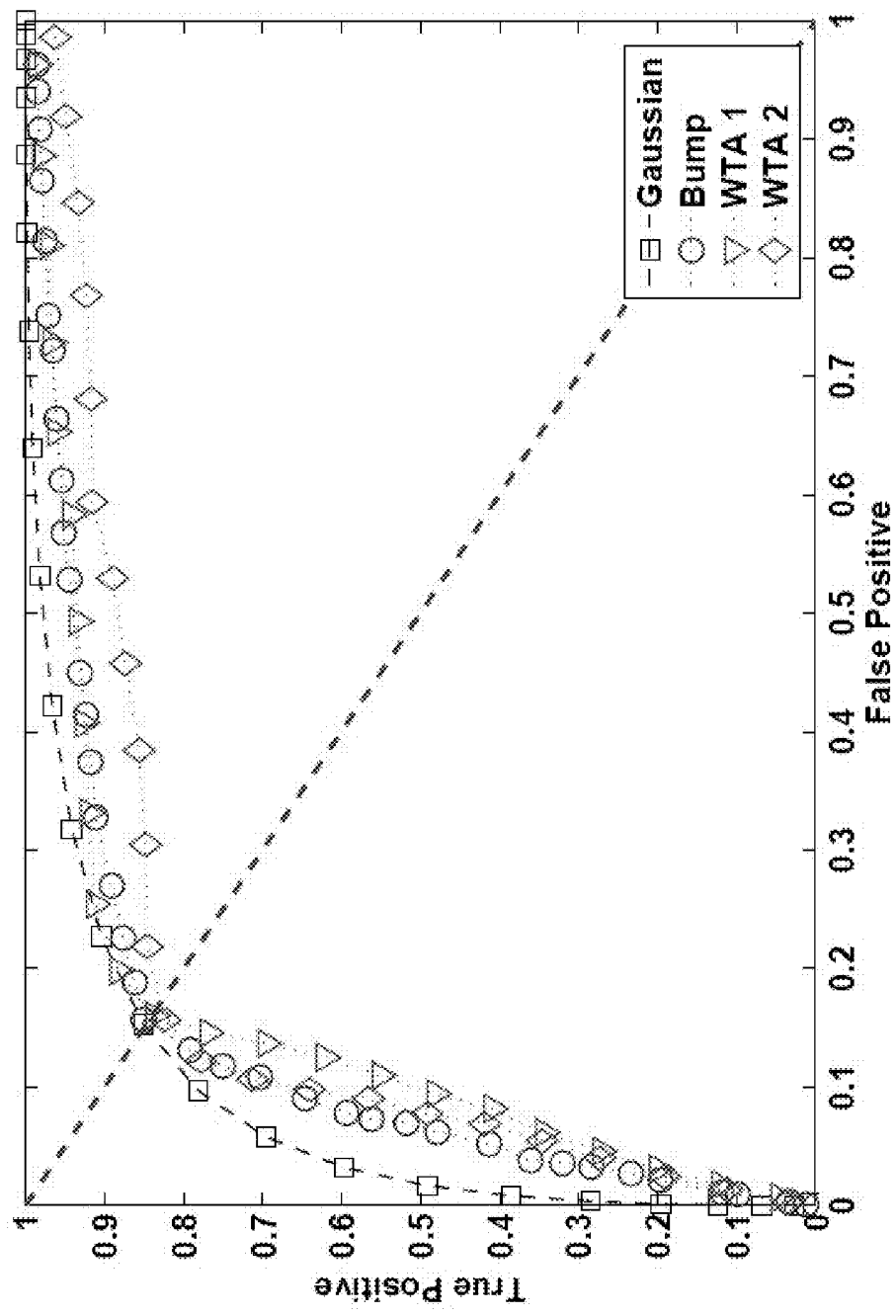
FIG. 16 provides a graph of the receiver operator characteristic curve of the Gaussian fits (shown as squares in FIG. 16), the output currents of the two-dimensional analog classifier circuits 100 (shown as circles in FIG. 16), and the WTA cell output voltages (shown as triangles and diamonds in FIG. 16) with the extracted standard deviation of 0.55V in an exemplary embodiment of the vector quantizer system 200.

FIG. 16 provides a graph of the receiver operator characteristic curve of the Gaussian fits (shown as squares in FIG. 16), the output currents of the two-dimensional analog classifier circuits 100 (shown as circles in FIG. 16), and the WTA cell output voltages (shown as triangles and diamonds in FIG. 16) with the extracted standard deviation of 0.55V in an exemplary embodiment of the vector quantizer system 200.

FIGS. 17A-B provide graphs of effects of the widths of the analog classifier circuits 100 in accordance with an exemplary embodiment of the present invention. FIG. 17A illustrates the effect of the width of the template vector of the analog classifier circuit 100 on the receiver operator characteristics. FIG. 17B illustrates the effect of the width of the template vector of the analog classifier circuit 100 on the equal error rate performance.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. An analog classifier circuit comprising:
a cascaded plurality of bump circuits each enabled to store a template vector, wherein the template vector can model a probability distribution with exponential behavior;
each bump circuit is enabled to generate an output corresponding to a comparison between an input vector received by each bump circuit and the template vector stored by each bump circuit;
a pair of variable gain amplifiers in communication with each bump circuit, wherein gain of the pair of variable gain amplifiers can be adjusted to modify the variance of the template vector circuit; and
an inverse generation block comprising at least two floating gate summing amplifiers for receiving an input vector and providing input voltages to the pair of variable gain amplifiers;
wherein an output of at least one bump circuit is tied to a bias input of a subsequent stage bump circuit.

2. The analog classifier circuit of claim 1, wherein the common mode charge of the pair of variable gain amplifiers can be adjusted to modify the variance of the template vector.

3. The analog classifier circuit of claim 2, wherein the adjustment of the common mode charge of the pair of variable gain amplifiers modifies the width of the transfer curve associated with the template vector.

4. The analog classifier circuit of claim 1, wherein the differential charge of the pair of variable gain amplifiers can be adjusted to modify mean of the template vector.

5. The analog classifier circuit of claim 4, wherein the adjustment of the differential charge of the pair of variable gain amplifiers modifies the center of the transfer curve associated with the template vector.

6. The analog classifier circuit of claim 1, wherein the analog classifier circuit is enabled to perform unsupervised learning to determine the appropriate template vector based on the input vector.

7. The analog classifier circuit of claim 1, further comprising an inverse generation block enabled to generate the output independent of a common-mode level of the input vector.

8. The analog classifier circuit of claim 7, wherein the inverse generation block is comprised of a pair of floating-gate summing amplifiers enabled to generate complementary input voltages.

9. The analog classifier circuit of claim 1, wherein the output is delivered to a winner-take-all circuit.

10. A vector quantizer system comprising:
a cascaded plurality of analog classifier circuits each comprising:
a bump circuit enabled to store a template vector, wherein the template vector can model a probability distribution with exponential behavior;
the bump circuit enabled to generate an output corresponding to a comparison between an input vector received by the bump circuit and the template vector stored by the bump circuit;
a pair of variable gain amplifiers in communication with the bump circuit wherein gain of the pair of variable gain amplifiers can be adjusted to modify the variance of the template vector; and
an inverse generation block comprising at least two floating gate summing amplifiers for receiving an input vector and providing input voltages to the pair of variable gain amplifiers;
wherein an output of at least one bump circuit is tied to a bias input of a subsequent stage bump circuit.

11. The vector quantizer system of claim 10, wherein the common mode charge of the pair of variable gain amplifiers can be adjusted to modify the variance of the template vector of the analog classifier circuit.

12. The vector quantizer system of claim 11, wherein the adjustment of the common mode charge of the pair of variable gain amplifiers modifies the width of the transfer curve associated with the template vector of one of the plurality of analog classifier circuits.

13. The vector quantizer system of claim 10, wherein the vector quantizer system can implement a Gaussian Mixture Model algorithm, a support vector machine algorithm, or a radial-basis function based algorithm.

14. The vector quantizer system of claim 13, wherein the vector quantizer system can perform unsupervised learning to determine the appropriate template vector for each one of the plurality of analog classifier circuits based on the input vector.

15. A method of information classification, comprising the steps of:
storing a template vector in each of a cascaded plurality of bump circuits, wherein the bump circuits are each coupled to a pair of variable gain amplifiers, the pair of variable gain amplifiers are coupled to an inverse generation block comprising at least two floating gate summing amplifiers for receiving an input vector and for providing input voltages to the pair of variable gain amplifiers;
programming the variance of the template vectors by adjusting the pair of variable gain amplifiers;
receiving a plurality of input vectors to the cascaded plurality of bump circuits;
generating an output from the cascaded plurality of bump circuits corresponding to a product of comparisons of the input vectors and the template vectors;

wherein an output of at least one bump circuit is tied to a bias input of a subsequent stage bump circuit.

16. The method of information classification of claim 15, wherein the output from the cascaded plurality of bump circuits is at least partially dependent upon the difference in the variance of the input vectors and the variance of the template vectors.

17. The method of information classification of claim 15, wherein the output from the cascaded plurality of bump circuits at least partially dependent upon the difference between the mean of the input vectors and the mean of the template vectors.

18. The method of information classification of claim 15, wherein the output from the cascaded plurality of bump circuits at least partially dependent upon the difference between the maximum likelihood of the input vectors and the maximum likelihood of the template vectors.

19. The method of information classification of claim 15, further comprising the steps of performing unsupervised learning to determine the appropriate template vectors based on the input vectors and adjusting the variance of the template vectors based upon the unsupervised learning.

20. The method of information classification of claim 15, further comprising the step of delivering the output from the cascaded plurality of bump circuits to a winner-take-all circuit.

* * * * *